2,835,343

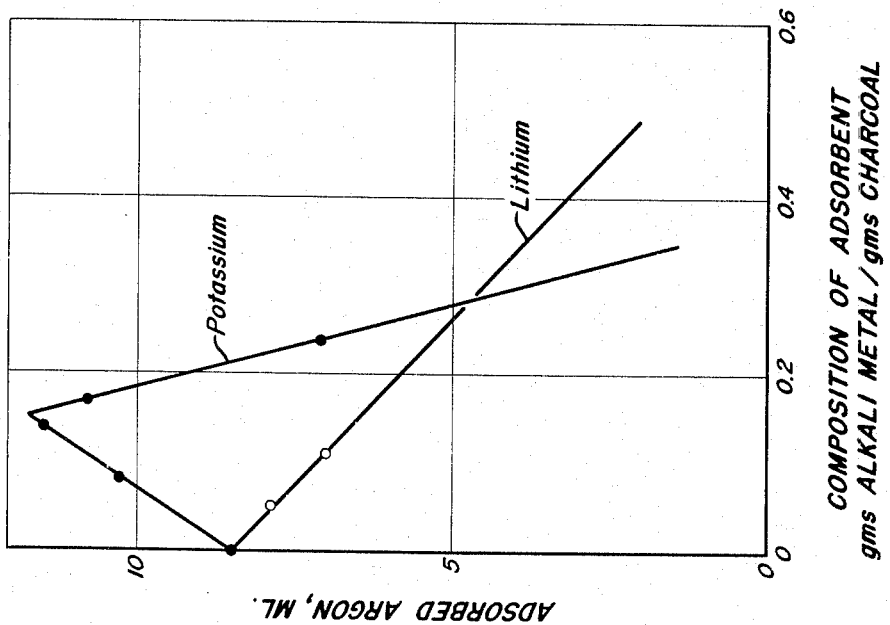
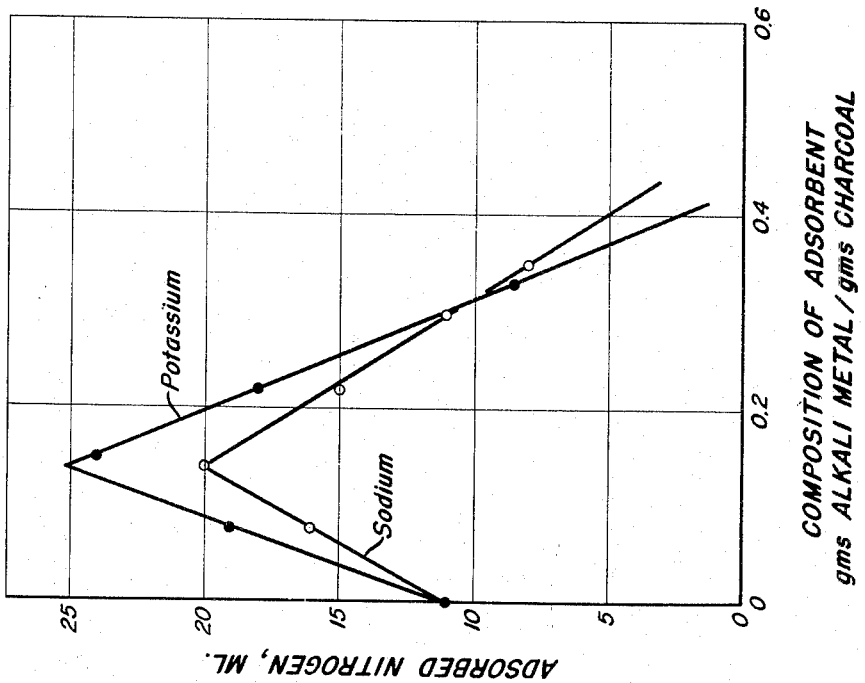

GAS ADSORPTION WITH AN ALKALI METAL-ACTIVATED ADSORBENT

William F. Wolff, Park Forest, and Philip Hill, Lansing, Ill., assignors to Standard Oil Company, Chicago, Ill., a corporation of Indiana Application September 20, 1956, Serial No. 610,961

8 Claims. (Cl. 183—114.2)

This invention relates to the adsorption of gases, and in particular, it concerns the adsorption of alkali-inert gases using an improved adsorbent.

Activated charcoals have heretofore been employed in the adsorption of gases. They have been employed in the preparation and maintenance of inert atmospheres, as getters, and in separation of gases. Frequently they are used in gas masks for purifying air from toxic components. The capacity of activated charcoal as an adsorbent for gases leaves something to be desired, however.

An object of this invention is to provide an improved process for adsorbing alkali inert gases. Another object is to provide an improved gas adsorbent which has a capacity for adsorbing larger amounts of gas than activated charcoal is capable of adsorbing. A further object of this invention is to provide an improved process for achieving a concentrating effect or separation of a gas from the mixture of gases. Other objects and advantages of the present invention will be more readily understood from the detailed description thereof.

It has been found that certain alkali metal-activated carbon compounds are unusually effective as adsorbents for alkali inert gases. These materials are more effective than the activated carbon itself. The alkali metal-activated carbon absorbent contains between about 0.05 to 0.2 parts of sodium and/or potassium, preferably the latter, per part by weight of the activated carbon. They are prepared by melting the alkali metal and mixing it with the activated carbon to obtain an extensive dispersion of alkali metal upon and within the activated carbon. The improved adsorbents can then be used for the adsorption of alkali inert gases such as nitrogen, helium, neon, argon, ethylene, isobutane, and the like, either from an atmosphere which contains one of these gases or from an atmosphere containing a mixture of gases. The improved adsorbent can be used to separate a mixture of gases in the same manner that activated carbon is used, and in some instances, the improved adsorbent is capable of effecting a separation of gases, e. g., preferentially adsorbing nitrogen from a nitrogen-argon mixture, where the activated carbon itself is incapable of effecting separations.

The alkali metal-activated carbon adsorbent can be used in adsorbing gases in all instances wherein the activated carbon alone is employed, with the exception that it should not be used with a gas which is highly reactive with the alkali metal. Thus, it can be employed for adsorbing the gases listed in group 0 of the periodic table, gases such as helium, neon, argon, krypton, xenon, etc. It can be also employed for the adsorption of nitrogen. If it is contacted with oxygen, the latter is adsorbed and forms a more stabilized adsorbent by reason of conversion of the alkali metal to its oxide. This more stable form of the adsorbent is also highly effective since it has a greater adsorption capacity than the activated carbon alone. Hydrocarbon gases are readily adsorbed. For example, ethylene, propylene, butane, isobutane, and the like, are adsorbed by the alkali metal-activated carbon adsorbent.

Our improved adsorbent is believed to consist of the alkali metal highly dispersed upon and within the activated carbon. In order to obtain an alkali metal-activated carbon adsorbent which has a greater adsorption capacity than activated carbon alone, it is essential that the alkali metal be sodium or potassium. Lithium, in fact, decreases the adsorption capacity of the activated carbon, and in all instances, the addition thereof renders the adsorbent's capacity poorer than that of activated carbon alone. Potassium increases the adsorptive capacity to a greater extent than does sodium. It is also essential that the improved adsorbent contain between about 0.05 to 0.2, for example, about 0.15 parts of the alkali metal by weight per part by weight of the activated carbon. The use of less than .05 parts of alkali metal per part of the activated carbon by weight causes only a slight increase in the adsorption capacity. The presence of more than about 0.2 (in some instances 0.25) parts of alkali metal per part of activated carbon by weight reduces the adsorptive capacity to less than the capacity which the activated carbon itself displays.

The improved adsorbent is prepared by thoroughly mixing the melted alkali metal under an inert atmosphere e. g. helium, nitrogen etc., with the activated carbon particles until the alkali metal is thoroughly dispersed upon and within the activated carbon. For example, molten sodium or potassium can be stirred with the activated carbon using a helium atmosphere and at temperatures on the order of 100° to 300° C. or thereabouts for about five minutes to one-half hour, or thereabouts. The alkali metal becomes adsorbed on the activated carbon and the appearance of the finished adsorbent, is about the same as that of the activated carbon initially employed. It is essential that activated carbon be used in preparing the adsorbent. Other forms of carbon, such as graphite, are relatively ineffective as conventional adsorbents and also in the preparation of the improved adsorbents of this invention. The active carbon used in that form conventionally and commercially known as "activated carbon." It is generally prepared by carbonizing bones, blood, cellulosic materials such as wood, corn cobs, fruit pits, sawdust, nut shells, such as cocoanut shells, and the like, at temperatures below 600° C. and in the absence of air. Activated carbons prepared from cocoanut shells are preferred for use in this invention. Thereafter the carbon produced is activated by a controlled oxidation with suitable gases, such as steam and/or carbon dioxide and/or air at temperatures between 400° and 900° C. Various activating materials such as zinc chloride, and the like, can be incorporated prior to the controlled oxidation step. The activated carbons have various adsorptive capacities due to differences in the raw materials from which manufactured and the differences in manufacturing techniques. Nevertheless, by incorporating, the alkali metal, the adsorptive capacity of any particular activated carbon is increased so that it is greater than the activated carbon from which it is prepared. The activated carbon generally has a total surface area between 500 and 1000 sq. m. per gram. While we do not wish to be bound by any theory, we believe that the sodium and/or potassium enters between the graphitic layers contained in the activated carbon and spreads them apart, thus permitting the gases to enter and be adsorbed in spaces which they could not previously enter since their molecular diameter was larger than the opening available.

The adsorption of gases with the alkali-activated carbon adsorbent is carried out under the conditions usually employed in the prior art for adsorbing gases upon activated carbon. The adsorption can be carried out at temperatures of from 0° C. or even lower, up to about 200–300° C., using pressures ranging from atmospheric or below up to 100 atmospheres or thereabouts. The adsorbent is capable of adsorbing a greater amount of gas at the lower temperatures, and, therefore, atmospheric temperatures can conveniently be employed. Either batch or continuous adsorption techniques can be used. The adsorbent can be employed in the form of a fixed, moving or fluidized bed of adsorbent particles.

After adsorption of the desired amount of gas, the adsorbent can be regenerated by the usual techniques employed for desorption. The adsorbent containing adsorbed gas can be subjected to heating (usually to a temperature higher than that employed in the adsorption step), preferably while maintaining reduced pressure. Stripping with some other inert gas whose presence is permissible may also be used to assist desorption. Desorption temperatures which may thus range between 25° and 300° C. may be used. If desired, the gases can be desorbed by adding a liquid hydrocarbon and heating.

Mixtures of gases can be separated by the use of our improved adsorbent. Thus, the non-adsorbed portion of the gas mixture can be enriched in one or more of the gas components thereof or a desorbed gas stream can be produced which is enriched in one or more of the gas components contained in the original mixture. The separation or concentration of certain components of a gas mixture may be achieved by reason of the different rates of adsorption or desorption of the various gas components or because the adsorbent adsorbs the gas mixture in a ratio which differs from the ratio of the components in the original mixture. The preceding phenomena are relied upon in effecting the separation of gases using an activated carbon adsorbent. In the same fashion, our improved adsorbent makes use of such phenomena in the separation of gases. In addition, our adsorbent is capable of causing the separation of gases which could not be separated using activated carbon. For example, if activated carbon is saturated with a nitrogen-argon mixture, the gases which are subsequently desorbed have the same composition as the original mixture. However, when our alkali-activated carbon is contacted with the same gas mixture under the same conditions, the non-adsorbed gas is enriched in argon and the gas subsequently desorbed from our adsorbent is enriched in nitrogen. Other mixtures of gases likewise can be separated by the use of our improved adsorbent, whereas such mixtures could not be separated by using activated carbon.

A number of experiments were carried out which demonstrate the efficacy of our invention. In these experiments, the gas adsorbing capacity of activated charcoal and of activated charcoal containing varying amounts of alkali were measured. Particles of activated cocoanut charcoal (Sargent's) where used in preparing the adsorbent. The alkali metal-activated charcoal adsorbents were prepared which contained alkali metal in an amount ranging from 0.07 to 0.35 gram of alkali metal per gram of charcoal. The experiments were carried out by heating approximately 13.9 grams of activated charcoal under a nitrogen atmosphere and then adding the specific amount of molten alkali metal at about 150–200° C. followed by heating to 300° C. with stirring for about one-half hour until the alkali metal was thoroughly dispersed on and within the activated charcoal. Adsorption of the nitrogen occurred since the alkali metal-activated charcoal was prepared under an atmosphere of nitrogen. The amount of adsorbed nitrogen was then measured. This was done by cooling the reaction vessel to about room temperature and adding 25 cc. of n-heptane which caused desorption of the nitrogen. The gas was collected by water displacement and its amount measured. The results obtained are shown in Table I, which follows:

Table I

| Run No. | Gas | Alkali Metal | gms. Alkali Metal/gm. Charcoal | Vol. Adsorbed gas, ml./gm. |
| --- | --- | --- | --- | --- |
| 1 | Nitrogen | None | | 11 |
| 2 | do | Sodium | 0.07 | 16 |
| 3 | do | do | 0.14 | 20 |
| 4 | do | do | 0.22 | 15 |
| 5 | do | do | 0.29 | 11 |
| 6 | do | do | 0.35 | 8 |
| 7 | do | Potassium | 0.07 | 19 |
| 8 | do | do | 0.14 | 24 |
| 9 | do | do | 0.22 | 18 |
| 10 | do | do | 0.33 | 8.5 |

The results shown in Table I are plotted graphically in Figure I. It is particularly evident from Figure I that the alkali metal-activated charcoal adsorbent which contains between 0.05 to 0.2 parts of alkali metal per part of charcoal by weight is appreciably better than the activated charcoal itself. It is further evident that the potassium-activated charcoal is superior to the sodium-activated charcoal since it enables the adsorbent to adsorb a greater quantity of gas.

Additional experiments were carried out using a potassium-activated charcoal as an adsorbent and using lithium-activated charcoal as an adsorbent for the adsorption of argon. In these experiments, the adsorbents used contained various amounts of the alkali metals. The effectiveness of our adsorbent for adsorbing helium was determined and compared with the activated charcoal free of alkali metal. The experiments were carried out in the same manner as was discussed above, except that an argon atmosphere (a helium atmosphere in runs 18 and 19) was employed. The amount of adsorbed gas was measured. The results obtained are shown in Table II, which follows:

Table II

| Run No. | Gas | Alkali Metal | gms. Alkali Metal/gm. Charcoal | Vol. Adsorbed gas, Ml. |
| --- | --- | --- | --- | --- |
| 11 | Argon | None | | 8.5 |
| 12 | do | Potassium | 0.08 | 10.3 |
| 13 | do | do | 0.14 | 11.5 |
| 14 | do | do | 0.17 | 10.8 |
| 15 | do | do | 0.24 | 7.1 |
| 16 | do | Lithium | 0.05 | 7.9 |
| 17 | do | do | 0.11 | 7.0 |
| 18 | Helium | None | | 3.1 |
| 19 | do | Potassium | 0.14 | 3.5 |

The results shown in runs 11 through 17 of Table II are plotted graphically in Figure II. As was the case in Figure I, the results show that there is a maximum adsorption capacity when the potassium-activated charcoal contains approximately 0.15 parts of alkali metal per part of charcoal by weight. The results further show that lithium-activated charcoal displays no such maxima, and instead, the addition of lithium to the charcoal steadily decreases its adsorptive capacity.

Another experiment was carried out in which the adsorbent of our invention was contacted with a mixture of nitrogen and argon to effect separation of the two gases. The adsorbent used was prepared by thoroughly mixing 13.9 grams of the activated charcoal with 1.9 grams of molten potassium at a temperature of about 200–300° C. for about 10–15 minutes in a helium atmosphere. The product was cooled to room temperature and then 1500 cc. of a gas mixture consisting of 52.6% nitrogen and 47.4% argon were passed through the bed of adsorbent over a ten-minute period. The adsorbed gases were then displaced by adding 25 cc. of dodecane to the saturated adsorbent. The adsorbed gas was analyzed and found to contain 64.5% nitrogen and 35.5% argon. When the same gas mixture was passed in the identical manner through the activated carbon containing no alkali metal, the gas desorbed therefrom was found to contain 53% nitrogen and thus displayed no selectivity whatsoever. Thus, the adsorbent of our invention is capable of concentrating or separating nitrogen from argon whereas activated charcoal is not capable of doing so.

A sodium-activated cocoanut charcoal adsorbent (containing 1.9 grams of sodium and 13.9 grams of charcoal) was contacted at room temperature with a methane-ethylene gas mixture containing 1.3 moles of ethylene per mole of methane. Approximately 3 liters of the gas mixture were contacted with the adsorbent. The adsorbed gases were desorbed by adding n-heptane and 255 cc. of gas were obtained as a desorbate. Mass spectrometer analysis of the desorbed gas showed the presence of a large amount of ethylene completely free of methane.

Another adsorption experiment was carried out in the same manner as the preceding one, except that the gas mixture charged contained n-butane and isobutane in a molar ratio of 0.89:1. The gas desorbed on heating the saturated adsorbent had a molar ratio of n-butane:isobutane of 1.09:1. Thereafter water was added to the adsorbent to spring an additional amount of adsorbed gas which had an initial n-butane:isobutane ratio of 1.44:1, and a final n-butane:isobutane ratio of 1.76:1.

While our invention has been described with reference to certain specific examples, the invention is not to be considered as limited thereto, but includes within its scope such modifications and variations as would occur to one skilled in this art.

We claim:

1. In an adsorption process wherein a gas selected from the group consisting of nitrogen, the gases of group zero of the periodic table, normally gaseous hydrocarbons, and mixtures of said gases are contacted with an activated carbon absorbent under adsorption conditions, the improvement which comprises contacting said gas with an alkali metal-activated carbon adsorbent containing between about 0.05 to 0.2 parts by weight of an alkali metal selected from the group consisting of sodium, potassium, and mixtures thereof per part by weight of the activated carbon and which adsorbent is prepared by mixing said alkali metal in molten form with the activated carbon under an inert atmosphere to obtain a well dispersed alkali metal upon and within the activated carbon, the contacting of said alkali metal-activated carbon adsorbent with normally gaseous hydrocarbons being carried out at a temperature lower than room temperature.

2. The process of claim 1 wherein the alkali metal is potassium.

3. The process of claim 1 wherein the activated carbon is activated cocoanut charcoal.

4. The process of claim 1 wherein a mixture of gases is contacted with said alkali metal-activated carbon adsorbent.

5. The process of claim 1 wherein the activated carbon contains about 0.15 parts of potassium per part by weight of the activated carbon, and said activated carbon is activated cocoanut charcoal.

6. The process of claim 1 wherein nitrogen gas is preferentially adsorbed on said alkali metal-activated carbon adsorbent from a mixture comprised essentially of nitrogen and argon.

7. The process of claim 1 wherein ethylene gas is preferentially adsorbed on said alkali metal-activated carbon adsorbent from a mixture of normally gaseous hydrocarbons containing methane and ethylene.

8. The process of claim 1 wherein n-butane gas is preferentially adsorbed on said alkali metal-activated carbon adsorbent from a mixture of normally gaseous hydrocarbons containing n-butane and isobutane.

References Cited in the file of this patent

UNITED STATES PATENTS 1,731,473    Naugle _____ Oct. 15, 1929